(12) United States Patent
Hsu et al.

(10) Patent No.: US 6,483,814 B1
(45) Date of Patent: Nov. 19, 2002

(54) CHANNEL-ADAPTIVE RADIO MODEM

(75) Inventors: Hui-Pin Hsu, Northridge, CA (US); James H. Schaffner, Chatsworth, CA (US)

(73) Assignee: HRL Laboratories, LLC, Malibu, CA (US)

(*) Notice: Subject to any disclaimer, the term of this patent is extended or adjusted under 35 U.S.C. 154(b) by 0 days.

(21) Appl. No.: 09/383,105

(22) Filed: Aug. 25, 1999

(51) Int. Cl.[7] .............................. H04B 1/38; H04B 7/00
(52) U.S. Cl. ....................................... 370/277; 455/557
(58) Field of Search ................................ 370/210, 277, 370/278, 281, 282, 341, 343, 348, 431, 437, 443, 477, 480, 515, 535; 375/130–222; 455/557

(56) References Cited

U.S. PATENT DOCUMENTS

| | | | | |
|---|---|---|---|---|
| 4,355,399 A | * | 10/1982 | Timor | 375/1 |
| 4,780,885 A | * | 10/1988 | Paul et al. | 375/40 |
| 5,365,516 A | * | 11/1994 | Jandrell | 370/18 |
| 5,422,913 A | | 6/1995 | Wilkinson | |
| 5,430,759 A | * | 7/1995 | Yokev et al. | 375/202 |
| 5,469,468 A | * | 11/1995 | Schilling | 375/200 |
| 5,761,634 A | * | 6/1998 | Stewart et al. | 704/220 |
| 5,768,306 A | * | 6/1998 | Sawahashi et al. | 375/206 |

OTHER PUBLICATIONS

Bullock, S.R., "Transceiver System Design for Digital Communications" (Atlanta, Noble Publications, 1995) pp. 1, 15, 16.

Hao X., et al., "The Sliding Correlator and Network Analyzer Channel Sounding Methods for Wideband Multipath Propagation Measurements at 5.85 Ghz," *Advancing Microelectronics—1998 Special Wireless Issue*, vol. 25, No. 3 (1998), pp. 17–28.

* cited by examiner

*Primary Examiner*—Alpus H. Hsu
*Assistant Examiner*—Toan Nguyen
(74) *Attorney, Agent, or Firm*—Ladas & Parry

(57) ABSTRACT

The present invention provides an apparatus for and method of determining the nature of the wireless environment which is in use and dynamically selecting appropriate frequency channels for data transmissions which are more likely to accommodate sustained data transmission at high speeds.

30 Claims, 3 Drawing Sheets

CHANNEL-ADAPTIVE RADIO MODEM

TECHNICAL FIELD

This invention relates to high speed data communications over wireless links such as radio links. The present invention is further related to determining the nature of the wireless environment which is in use and dynamically selecting appropriate frequency channels for data transmissions which are more likely to accommodate sustained data transmission at high speeds.

BACKGROUND OF THE INVENTION

Wireless transmissions, and more particularly radio transmissions, are subject to many environmental factors which degrade the effectiveness of the wireless transmissions. One environmental effect is the physical reality that wireless signals reflect off many surfaces, including buildings, mountains, and even moving objects as such vehicles and/or airplanes. When wireless signals bounce off one or more such objects before arriving at a receiving station, the receiving station receives more than one version of the transmitted signal. This is due to the fact that there are often a number of different routes by which the transmitted signal can find its way to the receiving station. For example, the signal may have a direct path and may have another path which bounces off an object such as a mountain, for example. If there a numerous possible paths, then numerous versions of the transmitted signal arrive with differing signal strengths and at different times. Sorting out these numerous signals can be a difficult problem for the receiving apparatus at the receiving station and can cause a type of interference which is often referred to as multipath (multiple path) interference. In the prior art, adaptive equalization has been employed as one means to mitigate against channel degradation effects (for example, multipath interference) caused by environmental factors.

A popular method of adaptive equalization takes a training signal which sets a digital signal processing phase network to sum up the received signal, which contains multiple path signals, as they arrive at the receiver into one coherent signal.

BRIEF DESCRIPTION OF THE INVENTION

The present invention is directed to a new channel-adaptive wireless method and apparatus that provides for reliable aggregated data transport, particularly for high speed wireless networks. A radio modem is disclosed, which according to the present invention, can be reconfigured in real-time based on wireless (e.g. radio) channel characteristics provided by a built-in broadband propagation path sensor which performs radio channel characterization, on some periodic basis such as prior to each data transmission session and/or at regular intervals during a session. In the preferred embodiment, the propagation environment is measured in the time domain with a pilot signal using spread spectrum techniques, and then transformed and translated into a frequency domain of interest. Frequencies where the propagation is poor are noted and the communication channels are then established at one or more frequency channels where reliable data communications can be maintained. The wireless environment is periodically tested and frequency channel(s) used for data transmission is(are) moved or changed dynamically when appropriate.

Preferably, the pilot signal is phase-shift keyed with a pseudo-random noise (PN) code such that its frequency content covers the entire frequency spectrum of interest. The pilot signal is transmitted at a transmitting site and received at a receiving site where it is correlated, after appropriate demodulation, against an identical PN code in the receiver. The received, demodulated signal is then transformed into the frequency domain to determine which channels have the least impairment in terms of fading in the frequency domain. High priority channels are moved to those frequencies channels which have the least impairment to maintain reliable data communications. Adaptive equalization can still be performed, if desired, but the amount of equalization needed in an individual channel may be substantially reduced.

The present invention has certain advantages over the existing radio modem technologies:

The radio link can be characterized at all frequencies in one measurement. Thus, the entire spectrum can be tested allowing dynamic assignment of channels only in those frequency bands exhibiting low propagation path impairment. Known adaptive equalization techniques may be performed on individual channels. As a result, a very high quality of data communications can be provided which exhibits low bit error rates.

The present invention allows for the pre-selection of propagation channels with lower levels of impairment to relieve excessive adaptive equalization processing. The preferred approach is essentially a frequency division multiplexed (FDM) approach in which the speed requirement of individual channels can be on the order of 100 Mbps for simplified baseband transmitter and receiver circuits, and yet the channels can be multiplexed together to provide a high aggregate data rate for data communications.

The present invention does not require adaptive attune techniques that utilize multiple antenna elements in order to obtain satisfactory results. The adaptive techniques of the present invention involve detecting a signal from multiple received signals and then selecting appropriate signal paths (by selecting appropriate channel frequencies) to reduce multipath impairment. Thus, wireless communication devices can be made compact by using a single set of transmit and receive antennas compared to the prior art practice of using multiple antenna elements for spatial diversity. To attain this compactness, the present invention gives up some spectrum by inhibiting transmission at impaired frequencies, but has the advantage of not requiring multiple antennas.

The present invention offers a means to increase the data transport capability of the radio channel by using more bandwidth-efficient modulation schemes (e.g. M-ary QAM vs. BPSK) for frequency bands with less propagation impairment for data communications.

The radio links with numerous receivers can be characterized in one measurement. For example, the invention can be used with a command post which communicates with units in the field in different areas. The radio modems used at the field units will usually characterize the wireless environment differently. That is, each unit in the field may determine that it can best communicate with the command post on a different sets of acceptable frequency channels. However, since the entire frequency spectrum is tested in one measurement action, all field units learn at the same time the best frequencies for each of them to use.

Once an acceptable set of frequency channels are determined, the party sending data to the other radio modem receiver may use just one acceptable channel for data communication or may use several channels depending on the transmission protocol used and the type of modulation used.

The term "data communications" as used herein means any type of data communication, including voice communications (both analog and digital), facsimile, computer data, video, images, and the like.

DETAILED DESCRIPTION

The present invention provides a new propagation channel-adaptive wireless data transmission concept that provides an aggregated data transport capability of a gigabit per second or more for high speed wireless data communications and access. The devices which perform the wireless communication are referred to as radio modems herein. The disclosed radio modems are reconfigured in real-time by first characterizing the wireless environment (e.g. the nature of the radio channel) using a built-in channel pilot signal sounding capability prior to a data communication session and at regular intervals during the data communication session, as necessary or as desired. The radio link is preferably characterized across an entire signal band at a carrier frequency and individual frequency channel parameters, such signal fade and delay spread, are automatically noted. A set of preferred frequency channels in the signal band at the carrier frequency are dynamically selected for the transmission, resulting in a frequency division multiplexed (FDM) spectrum, with gaps located at those frequency channels where fading is severe due to multipath interference and/or other wireless environmental problems.

Figure 1:
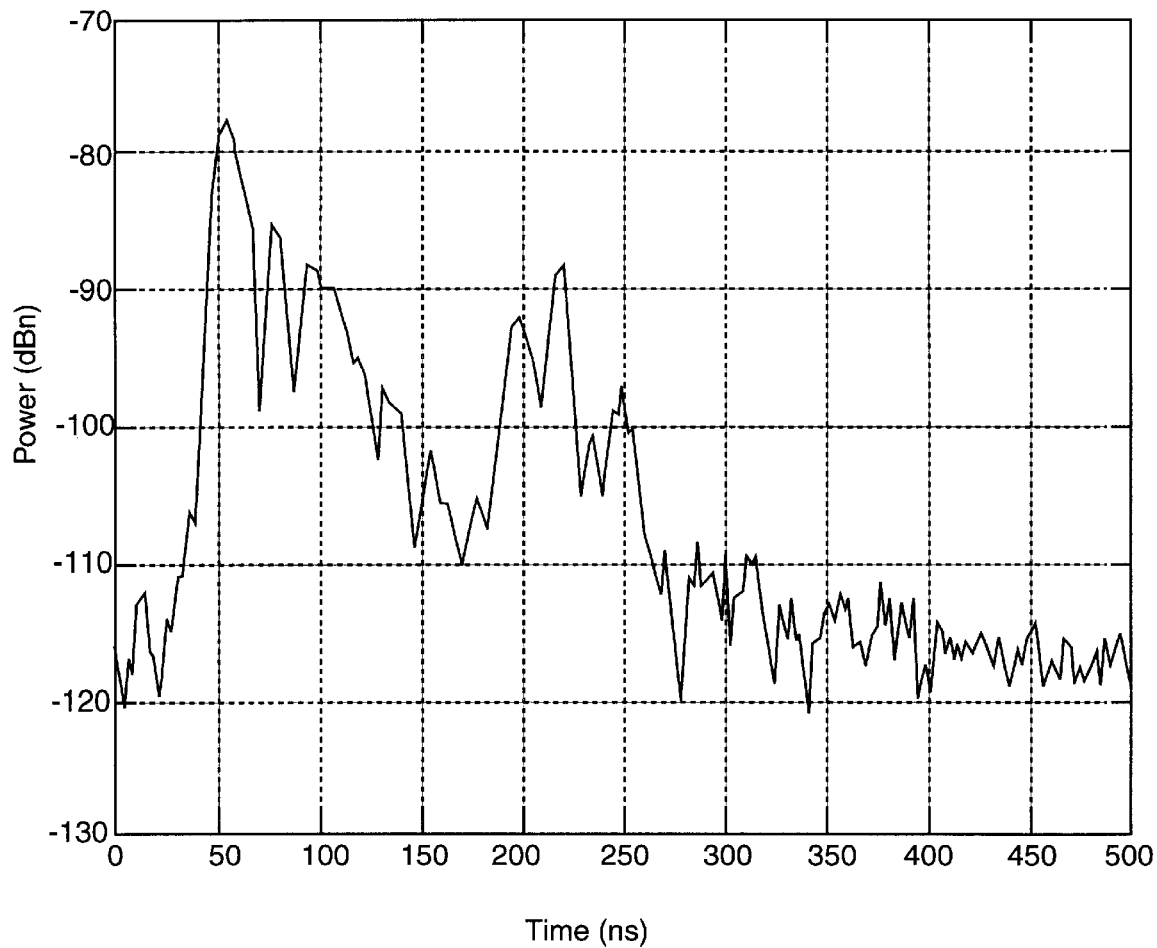
FIG. 1 is a typical radio link impulse response.

The radio modem is reconfigurable based on the its built-in ability to characterize the radio link prior to each data transmission session and/or at appropriate times during the transmission session. The radio link is characterized over the entire signal band at the carrier frequency. The preferred method of wideband characterization is to transmit a pilot signal with a carrier that is modulated by a pseudorandom noise (PN) coded data stream with a bit rate that is fast enough to cause spreading of the carrier across the entire signal band of interest, a process that is well known to those skilled in the art of spread spectrum radio transmission. The radio modem which transmits the PN coded data stream is referred to as the transmitter version of the radio modem herein. At a receiving end, a receiver version of the radio modem, an identical PN code is generated, but at a rate that is slightly slower than the PN code which is transmitted. The received signal, which includes channel impairments such as multipath reflections and diffraction over the radio propagation paths, is demodulated down to the PN code. This code is correlated against the receiver generated PN code which "slides" in time against the received code. When the two codes line up, a correlation peak occurs. There is usually a correlation peak for each reflected signal picked up by the receiver. The strength of the correlation peak is proportional to the strength of the particular transmission path being measured, with the strongest peak occurring for a line-of-sight (non-reflected) component (if there is one). The resulting correlation vs. time, which is preferably stored in memory, represents the impulse response of the radio link. It is assumed that the correlation is performed in the complex domain, using techniques for IQ demodulation that are known to those skilled in the art, and therefore the phase as well as magnitude of the radio link impulse response is determined. FIG. 1 shows a typical time domain impulse response of a radio link measured by the sliding correlation technique (in solid line).

Figure 2:
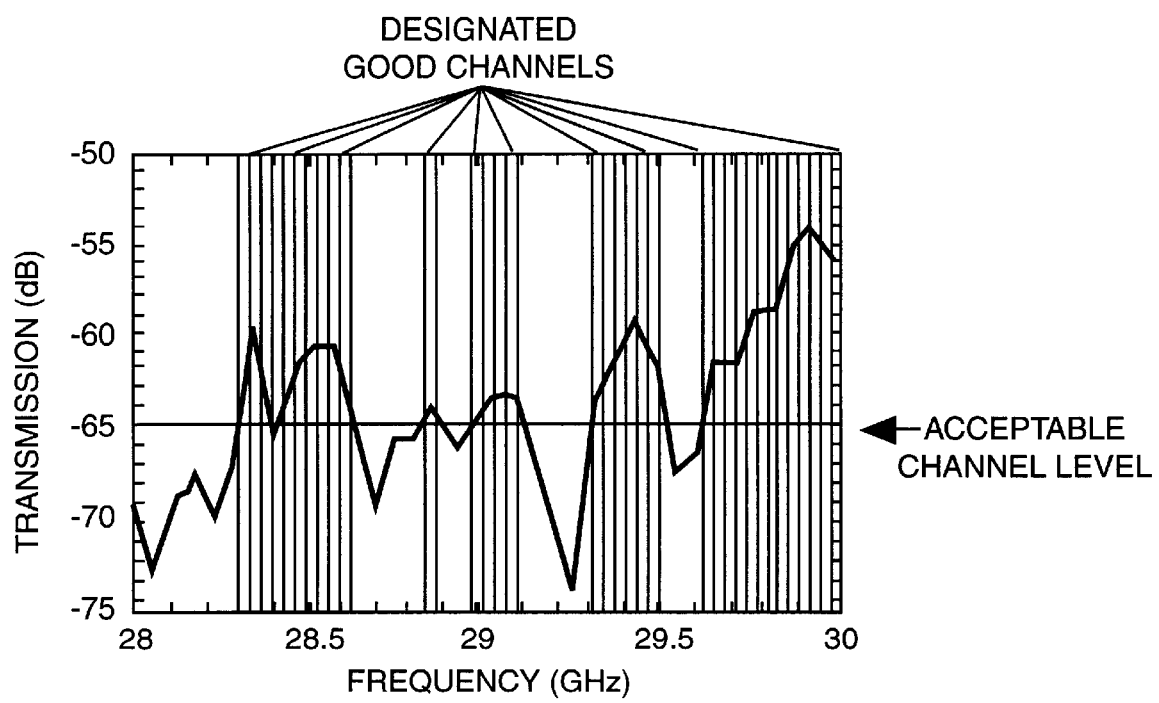
FIG. 2 is a graph of acceptable channels determined for the radio link impulse response.

The time domain impulse response of radio link is then converted into the frequency domain by using the Fast Fourier Transform (FFT). Since the PN code rate was chosen to cover the entire band of interest, the frequency domain impulse response of the radio link also covers the entire signal band of interest. Due to radio link impairments, fading can occur at specific frequencies. A processor in the receiver version of the radio modem, which processor preferably selects the frequency channels to be used for data transmission, also notes the set of frequencies which currently have unacceptable or undesirable signal fading characteristics. Of course that set specifies the frequency-regions or channels that should be avoided during data communications. This information regarding the set of unacceptable/undesirable frequency channels is relayed back from the receiver version of the radio modem to the transmitter version radio modem so that a frequency channel plan can be used which uses "good" radio channels for high speed data communications and which avoids using "bad" (unacceptable or simply poor) radio channels. Frequency division multiplexing (FDM) is preferably used to provide parallel data communication channels over the link, but the channels may not be contiguous over frequency. An example of this process is shown in FIG. 2 for 45 MHz channel bandwidths that can cover an 28 GHz LMDS spectrum.

The transmitter version may be used with a plurality of receiver versions of the radio modem and since each receiver version may well select a different set of unacceptable/undesirable frequency channels, the transmitter version preferably stores information indicative of the proper frequency channel to use with each receiver version with which it must communicate.

The transmitter and receiver versions both have the ability to receive and transmit data and therefore share many components in common. This will become clear with reference to the following discussion where common or related elements are given common reference numbers in the transmitter and receiver versions of the radio modem.

Figure 3:
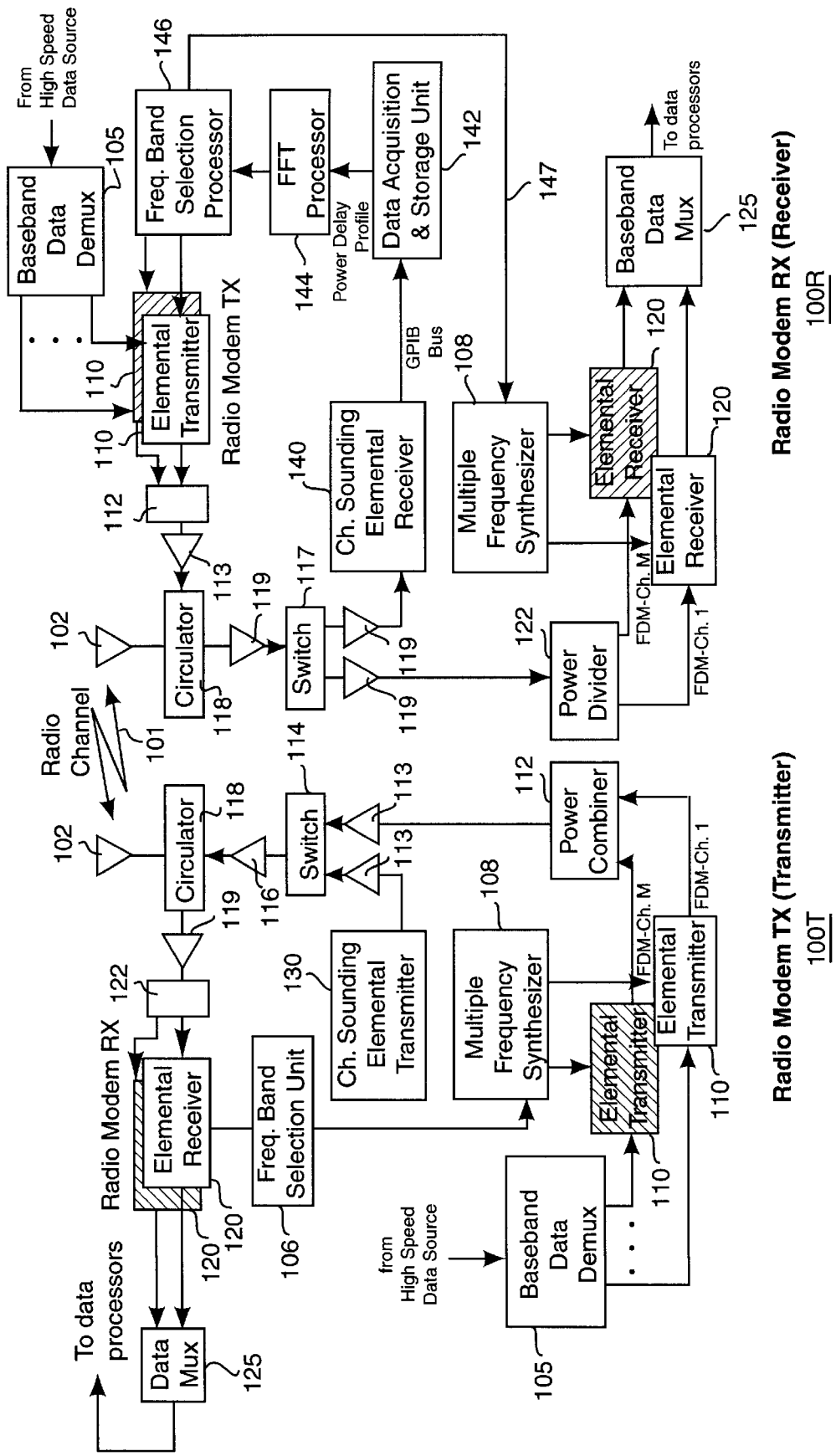
FIG. 3 is a block diagram of a two versions radio modem utilizing the present invention.

FIG. 3 shows a system block diagram of a channel-adaptive high speed radio modem. The radio modem is reconfigurable dynamically based on the radio link characteristics. As previously indicated, the radio modem preferably comes in two versions: a pilot channel transmitter version 100T and a pilot channel receiver version 100R. The reason for this is that to characterize the wireless environment only one sounding transmitter is required. In terms of a military example, the transmitter version 100T would typically be used at a command post while the receiver version 100R would typically be used at each of a plurality of units in the field. Those skilled in the art will soon appreciate the fact that the receiver version 100R and the transmitter version 100T are in many ways similar, so a single transceiver version, which would have both a pilot channel transmitter and a pilot channel receiver incorporated therein, might be desired by those skilled in the art for use in some (or all) applications.

The transmitter version 100T and receiver version 100R of the radio modem preferably both have the ability to send and to receive data and therefore each includes at least one elemental transmitter 110 and at least one elemental receiver 120 for sending and for receiving such data. Receivers and transmitters which operate in the high gigahertz bands are known to those skilled in the art. See, for example, Scott R. Bullock, "Transceiver System Design for Digital Communications" published by Noble Publications, Atlanta, Ga. 1995, which is hereby incorporated here by reference. If the radio modem needs to handle multiple simultaneous communications tasks or if the data communications needs are such that a single channel does not provide adequate bandwidth, then radio modem is preferably provided with a plurality of elemental receivers 120 and a plurality of elemental transmitters 110. In terms of the previously stated military example, the radio modem used at the command post would very likely have a larger number of elemental receivers 120 and elemental transmitters 110 compared to the radio modems used in field units since the bandwidth and data communication needs are more severe at a command post than at a field unit. As such, each of the radio modems used at field units which might have only one elemental receiver 120 and one elemental transmitter 110 per radio modem. Preferably however, even the field units are provided with a plurality of elemental receivers 120 and a plurality of elemental transmitters 110 to provide wider bandwidth communication capabilities than would be available from a single communication channel radio modem.

The radio modem uses a channel sounder which uses the pilot signal to identify a set of "good" frequency channels for radio transmission. Within the radio modem, modulation and demodulation of individual channels is accomplished by using a pair of elemental transmitters and receivers tuned to the same frequency channel or tuned to related frequency channels. If the modem has a plurality of elemental receivers 120 and a plurality of elemental transmitters 110, then the aggregated data channels are demultiplexed by a demultiplexer 105 before transmission by the elemental transmitters 110 and multiplexed by multiplexer 125 from the elemental receivers 120 after reception. Elements 105 and 125 are both called demultiplexers and multiplexers herein. However, those skilled in the art will realize that these elements 105 and 125 will often use combined multiplexers and demultiplexers since they will often receive data from several sources and distribute data to several users. Moreover, elements 105 and 125 may be eliminated in some embodiments, such as embodiments using only a single elemental transmitter 110 and a single elemental receiver 120 or in embodiments where the data to be transmitted and received can be assigned to a particular elemental transmitter without any multiplexing being needed. Thus, whether elements 105 and 125 are: (i) needed, (ii) embodied as a multiplexer, (iii) embodied as a demultiplexer or (iv) embodied as a combined multiplexer/demultiplexer will depend on the complexity of the data communication systems in which the present invention is utilized.

A separate pilot channel sounding elemental transmitter 130 in the transmitter version 100T periodically transmits a carrier modulated by a pseudorandom noise (PN) coded data stream across the path of radio link 101. As previously mentioned, the bit rate of PN code signal is fast enough to cause the spreading of the carrier across the entire spectral band of interest, a process that is well known to those skilled in the art of spread spectrum transmission. See, for example, Hao Xu, Theodore S. Rappaport, James Schaffner & H. P. Hsu, "The Sliding Correlator and Network Analyzer Channel Sounding Methods for Wideband Multipath Propagation Measurements at 5.85 Ghz," *Advancing Microelectronics*—1998 *Special Wireless Issue*, Vol. 25, No. 3, pp 17–28 the disclosure of which is hereby incorporated herein by this reference. As such, the pilot channel sounding elemental transmitter 130 has a relatively wide bandwidth compared to, for example, the normal bandwidth of the elemental transmitters 110.

In the receiver version 100R, a pilot channel sounding elemental receiver 140 also generates an identical PN code, but at a rate that is slightly slower than the PN code of the elemental transmitter 130. The received signal, which includes channel impairments such as multipath reflections and diffraction over the radio propagation paths, is demodulated down to the PN code. This down-converted received signal is correlated against the receiver generated PN code which "slides" in time against the received signal. When the PN code of the two signals line up, a correlation peak is recorded, and there is a correlation peak for each reflected signal picked up by the receiver. The strength of the correlation peak is proportional to the strength of the reflection. The resulting correlation vs. time represents the impulse response of the radio link and it is measured and stored in a data acquisition and storage unit 142. This time domain impulse response of radio link is then converted into frequency domain preferably by using a hard-wired FFT circuit 144. A processor 146 in receiver version 100R, taking note of those frequencies with deep fading, designates a set of possibly good radio channels in the available radio frequency spectrum. This information regarding a set of good channels is transmitted to the transmitter version 100T and is stored in memory in a Frequency Band Selection Unit 106 of the receiver version 100R. Thus, the frequency channel selection information is (i) relayed back to the transmitter version 100T for storage in memory in the Frequency Band Selection Unit 106 which is used to set-up one or more elemental transmitters 110 and one or more elemental receivers 120 using one or more of the "good" channels for high speed data transmission with the receiver version 100R and (ii) is also used to control the frequency channels used by the receiver version 100R for data communications (both transmission and reception). The transmission frequency of each elemental transmitter 120 and the receive frequency of each elemental receiver 110 is controlled by a multiple frequency synthesizer 108. The multiple frequency synthesizer 108 is controlled based on the frequency channel selection information determined by processor 146. In the case of a transmitter version 100T communicating with a plurality of receiver versions 100R, the unit 106 would preferably store frequency channel selection information for each receiver version 100R of the radio modem with which it communicates.

The frequencies generated by the multiple frequency synthesizer 108 may be at the desired transmission frequencies or at related frequencies. For example, those skilled in the art will appreciate that each elemental receiver 110 will likely have a local oscillator which controls its received frequency. Thus, the multiple frequency synthesizer 108 may well control such local oscillators. Moreover, frequency multipliers may be used to allow the multiple frequency synthesizer 108 to operate at frequencies lower than those used for data communications.

In both the receiver version 100R and the transmitter version 100T, the multiple frequency synthesizer 108 controls the frequencies of reception of the elemental receivers 120 and the frequencies of transmission elemental transmitters 110 even though, for ease of illustration, control lines are only shown as going to the elemental transmitters 110 in the case of the transmitter version 100T and only shown as going to the elemental receivers 120 in the case of the receiver version 100R.

It is possible to effectively aggregate channels together so that a high speed data stream can be transmitted across the link 101 using M channels of lower speed data streams. Thus, a plurality of elemental receivers 120 and a plurality of elemental transmitters 110 may be utilized (even by units in the field in terms of the previously stated military example) in order to achieve higher data rates than would be expected from a single channel transmission. Of course, the individual channels selected for communication need not be necessarily contiguous channels, as shown in FIG. 2. This may ultimately limit the total aggregated data rate since some of the spectrum may have to be reserved to avoid deep fade frequencies. Timing and synchronization header information is preferably added to each of the lower rate data streams in individual frequency channels which are then source and channel coded for error protection before being transmitted through a low propagation impairment frequency channel. If multiple elemental transmitters 110 are utilized (for example, to gain added bandwidth for data communications), then a radio frequency (RF) power combiner 112 combines these FDM channels (FDM Ch. 1 to FDM Ch. M as shown in FIG. 3) into a wideband RF signal. For the transmission, this wideband FDM signal is routed through a chain of RF circuits, which may typically include a preamp 113, a RF switch 114, a RF transmitter amplifier 116, and a circulator 118 before the RF signal is transmitted from an antenna 102.

In terms of receiving incoming data, if a plurality of elemental receivers 120 are utilized, then a power divider 122 divides the incoming data carrying wideband FDM signal M ways to feed M elemental receivers 120. The bandpass filter (BPF) in each elemental receiver 120 is tuned or otherwise configured to match a different selected frequency band of the FDM transmitter channel in accordance with the frequency plan defined by the frequency channel selection processor 146. As such, in the receiver version 100R, the frequency channel selection processor 146 communicates the frequency plan to the multiple frequency synthesizer 108 via a link 147, the frequency plan being stored in an associated memory. Similarly, the frequency plan is also used to control the transmission frequency of each elemental transmitter 110 for the purpose of sending data communications to the transmitter version of the radio modem 100T.

The incoming RF signals are received at antenna 102, transit a circulator 118 (if used), one or more RF preamps 119 (if used), switch 117 (if used), and the power divider 122 (if used), prior to reaching the elemental receiver(s) 120. Those skilled in the art will appreciate that a circulator 118 is preferably used if simultaneous data reception and transmission are to occur. If so, the transmissions and receptions by a given radio modem will be in different ones of the good channels. If the data receptions and transmissions need not be simultaneous, then the RF circuitry can be simplified since the circulator 118 can then be replaced by a more simple device, such as an RF switch.

If desired, adaptive equalizing can be utilized at each elemental receiver. Gross channel impairments are avoided by this radio link characterization process and each elemental receiver 120 (for a FDM channel) may have an adaptive filter to remove small scale (in frequency) channel impairments. By preselecting the operational carrier frequency for the radio link, this fine-scale adaptive equalization should be less complex than prior art equalizers, and it can compensate faster to smaller changes in the channel impairments. In short, the radio modem uses only frequency bands with low propagation impairment for the FDM-based data transmission. The elimination of frequency bands with deep fade in the radio link simplifies the receiver equalizer design. The FDM approach also reduces the speed requirement as well as the complexity of baseband circuits in elemental transmitters and receivers.

Furthermore, using only frequency bands with low propagation impairment selected by the channel sounding for the radio transmission also allows the radio modem to improve the quality of service (QoS) of radio link and data transport capability. The modulation scheme employed for each elemental transmitter and receiver pair can be dynamically adjusted in accordance with the propagation characteristics. A bandwidth efficient modulation scheme (e.g. M-ary QAM vs. BPSK), which demands radio channel with a lower propagation impairment to ensure its signal quality for a larger data transport capability in Bit/Hz at the receiver, can be dynamically assigned to frequency bands with lower propagation impairment. This modulation scheme selection and the frequency channel selection can be combined to realize a higher aggregated data transport rate for the data communications.

Having described the invention in connection with certain preferred embodiments, modification will now suggest itself to those skilled in the art. As such, the invention is not limited to the disclosed embodiments except as disclosed by the appended claims.

What is claimed is:

1. A channel-adaptive wireless modem for transmitting and receiving data, said radio modem-comprising:
   a broadband propagation path sensor for performing radio channel propagation characterization;
   a memory for storing information regarding communication channels having acceptable radio propagation characteristics;
   at least one elemental transmitter and at least one elemental receiver for transmitting and receiving data;
   a frequency controller for controlling the communication channel utilized by said at least one elemental transmitter and at least one elemental receiver, the frequency controller controlling data transmission by said at least one elemental transmitter to utilize at least one communication channel having acceptable radio propagation characteristics as determined by said broadband propagation path sensor, information regarding said the at least one communication channel being stored in said memory.

2. The channel-adaptive wireless modem of claim 1 wherein the broadband propagation path sensor comprises:
   a channel sounding elemental transmitter associated with a first radio modem, the channel sounding elemental transmitter transmitting a predetermined spread spectrum data signal;
   a channel sounding elemental receiver associated with a second radio modem for receiving spread spectrum data radio signals;
   a comparator for correlating signals received by the channel sounding elemental receiver with the predetermined spread spectrum data signal;
   a frequency domain analyzer for analyzing the correlated signals to convert the correlated signals into frequency domain information;
   a processor responsive to the frequency domain information generated by the frequency domain analyzer for updating said memory of said first radio modem and for updating said memory of said second radio modem with information indicative of at least one communication channel having acceptable radio propagation characteristics between said first radio modem and said second radio modem.

3. The channel-adaptive wireless modem of claim 2 wherein the first radio modem includes a plurality of elemental transmitters and a plurality of elemental receivers for transmitting and receiving data, the elemental transmitters of said plurality of elemental transmitters being controlled, during communications with said second radio modem, to utilize a different communication channel selected from a group of communication channels having acceptable radio propagation characteristics between said first radio modem and said second radio modem.

4. A radio modem transmitter for transmitting and receiving data communications comprising:
   a. a channel sounding transmitter for transmitting a relatively wide band signal for testing the radio environment;
   b. at least one elemental transmitter, said at least one elemental transmitter transmitting a relatively narrow band signal at a transmission frequency modulated with signals representing the at least some of the data communications to be transmitted;
   c. a frequency selection unit for controlling the transmission frequency of each elemental transmitter;
   d. at least one elemental receiver for (i) receiving data communications and (ii) receiving information regarding radio channels having acceptable radio propagation characteristics;
   e. a frequency band selection unit for controlling the transmission frequency of the at least one elemental transmitter, the frequency band selection unit including a memory for storing the received information regarding radio channels having acceptable radio propagation characteristics and controlling the transmission frequency of the at least one elemental transmitter so that it corresponds with at least one channel having acceptable radio propagation characteristics.

5. A radio modem transmitter as claimed by claim 4 wherein the at least one elemental transmitter comprises a plurality of elemental transmitters, each of which is tuned to a different frequency channel having acceptable radio propagation characteristics by the frequency band selection unit.

6. A radio modem transmitter as claimed by claim 5, wherein each of the plurality of elemental transmitters is modulated by a signal from a demultiplexer, the demultiplexer receiving, as an input thereto, the data communications to be transmitted.

7. A radio modem transmitter as claimed by claim 5 wherein the plurality of transmitters each have a RF output which is coupled to a common antenna.

8. A radio modem transmitter as claimed by claim 7 wherein the channel sounding transmitter has a RF output which is coupled to said common antenna.

9. A radio modem transmitter as claimed by claim 5 wherein the at least one elemental receiver comprises a plurality of elemental receivers, each elemental receiver being tuned to a different frequency channel having acceptable radio propagation characteristics by the frequency band selection unit.

10. A radio modem transmitter as claimed by claim 9, wherein each of the plurality of elemental receivers has at output connected to a multiplexer for multiplexing the outputs of the receivers and having, as an output, the data communications being received by the radio modem transmitter.

11. A radio modem for receiving and transmitting data communications comprising:
   a. a channel sounding receiver for receiving a relatively wide band signal for testing the radio environment;
   b. a frequency selection processor for determining radio frequency channels having acceptable propagation characteristics;
   c. at least one elemental transmitter, said at least one elemental transmitter transmitting a relatively narrow band signal at a transmission frequency modulated with signals representing (i) the at least some of the data communications to be transmitted and (ii) information regarding radio channels having acceptable radio propagation characteristics as determined by said frequency selection processor;
   d. at least one elemental receiver for receiving data communications;
   e. said frequency band selection processor controlling the transmission frequency of the at least one elemental receiver, the frequency band selection processor including an associated memory for storing the received information regarding radio channels having acceptable radio propagation characteristics and controlling the transmission frequency of the at least one elemental transmitter so that it corresponds with at least one channel having acceptable radio propagation characteristics.

12. A radio modem as claimed by claim 11 wherein the at least one elemental transmitter comprises a plurality of elemental transmitters, each of which is tuned to a different frequency channel having acceptable radio propagation characteristics by the frequency band selection processor.

13. A radio modem as claimed by claim 12, wherein each of the plurality of elemental transmitters is modulated by a signal from a demultiplexer, the demultiplexer receiving, as an input thereto, the data communications to be transmitted.

14. A radio modem as claimed by claim 12 wherein the plurality of transmitters each have a RF output which is coupled to a common antenna.

15. A radio modem as claimed by claim 14 wherein the channel sounding transmitter has a RF output which is coupled to said common antenna.

16. A radio modem as claimed by claim 11 wherein the at least one elemental receiver comprises a plurality of elemental receivers, each elemental receiver being tuned to a different frequency channel having acceptable radio propagation characteristics by the frequency band selection unit.

17. A radio modem transmitter as claimed by claim 16, wherein each of the plurality of elemental receivers has at output connected to a multiplexer for multiplexing the outputs of the receivers and having, as an output, the data communications being received by the radio modem transmitter.

18. A radio modem transmitter as claimed by claim 11, wherein the frequency selection processor has an associated time domain to frequency domain analysis processor to distinguish frequency channels having relatively good radio propagation characteristics from channels having relatively poor radio frequency propagation characteristics.

19. A radio modem transmitter as claimed by claim 11, wherein the frequency selection processor has an associated Fast Fourier Transform (FFT) processor.

20. A method of transmitting data communications by radio, said method comprising the steps of:

a. transmitting a spread spectrum signal at a first location;

b. receiving the spread spectrum signal at a remote location;

c. analyzing the received spread spectrum signal using frequency domain analysis to distinguish frequency channels having relatively good radio propagation characteristics from channels having relatively poor radio frequency propagation characteristics between the first location and the remote location; and d. transmitting the data communications using one or more channels having relatively good radio propagation characteristics and avoiding using channels having relatively poor radio propagation characteristics.

21. The method of claim 20 wherein the step of analyzing the received spread spectrum signal comprises performing a Fast Fourier Transform analysis of the received spread spectrum signal.

22. The method of claim 20 wherein the step of transmitting the data utilizes a plurality of non-adjacent frequency channels.

23. The method of claim 20 wherein the steps of transmitting a spread spectrum signal at a first location, receiving the spread spectrum signal at a remote location and analyzing the received spread spectrum signal are performed before a data communications session is initiated.

24. The method of claim 23 wherein the steps of transmitting a spread spectrum signal at a first location, receiving the spread spectrum signal at a remote location and analyzing the received spread spectrum signal are repeated periodically during the data communications session.

25. The method of claim 20 wherein the steps of transmitting a spread spectrum signal at a first location, receiving the spread spectrum signal at a remote location and analyzing the received spread spectrum signal are repeated periodically during a data communications session.

26. A channel-adaptive radio apparatus for transmitting and receiving data, said radio apparatus comprising:

a broadband propagation path sensor for performing radio channel propagation characterization of multiple communication channels;

a memory for storing information regarding communication channels having acceptable radio propagation characteristics;

at least one elemental transmitter for transmitting at least data;

at least one elemental receiver for receiving at least data; and a frequency controller for controlling the communication channel utilized by said at least one elemental transmitter and at least one elemental receiver, the frequency controller controlling data transmission by said at least one elemental transmitter to utilize at least one communication channel having acceptable radio propagation characteristics as determined by said broadband propagation path sensor, information regarding said the at least one communication channel being stored in said memory.

27. The channel-adaptive radio apparatus of claim 26 wherein the broadband propagation path sensor comprises:

a channel sounding elemental transmitter associated with a first radio modem, the channel sounding elemental transmitter transmitting a predetermined broadband spread spectrum data signal;

a channel sounding elemental receiver associated with a second radio modem for receiving spread spectrum data radio signals;

a comparator for correlating signals received by the channel sounding elemental receiver with the predetermined spread spectrum data signal;

a frequency domain analyzer for analyzing the correlated signals to convert the correlated signals into frequency domain information;

a processor responsive to the frequency domain information generated by the frequency domain analyzer for updating said memory of said first radio modem and for updating said memory of said second radio modem with information indicative of at least one communication channel having acceptable radio propagation characteristics between said first radio modem and said second radio modem.

28. The channel-adaptive radio apparatus of claim 27 wherein the first radio modem includes a plurality of elemental transmitters and a plurality of elemental receivers for transmitting and receiving data, the elemental transmitters of said plurality of elemental transmitters being controlled, during communications with said second radio modem, to utilize a different communication channel selected from a group of communication channels having acceptable radio propagation characteristics between said first radio modem and said second radio modem.

29. A radio for transmitting and receiving data communications comprising:

a. a channel sounding transmitter for transmitting a relatively wideband signal for testing the radio environment;

b. at least one elemental transmitter, said at least one elemental transmitter transmitting a relatively narrow band signal at a transmission frequency modulated with signals representing the at least some of the data communications to be transmitted;

c. a frequency selection unit for controlling the transmission frequency of each elemental transmitter;

d. at least one elemental receiver for (i) receiving data communications and (ii) receiving information regarding radio channels having acceptable radio propagation characteristics;

e. a frequency band selection unit for controlling the transmission frequency of the at least one elemental transmitter, the frequency band selection unit including a memory for storing the received information regarding radio channels having acceptable radio propagation characteristics and controlling the transmission frequency of the at least one elemental transmitter so that it transmission occur in said at least one channel having acceptable radio propagation characteristics.

30. A radio as claimed by claim 29 wherein the at least one elemental transmitter comprises a plurality of elemental transmitters, each of which is tuned to a different frequency channel having acceptable radio propagation characteristics by the frequency band selection unit.

* * * * *